Feb. 22, 1949.  C. B. HATHAWAY ET AL  2,462,184
QUIET SINGLE-PHASE MOTOR
Filed Oct. 12, 1944

WITNESSES:
Edward Michaels
Mr. C. Groome

INVENTORS
Clarence B. Hathaway &
Richard F. Woll.
BY C.B. Buchanan
ATTORNEY

Patented Feb. 22, 1949

2,462,184

UNITED STATES PATENT OFFICE 2,462,184

QUIET SINGLE-PHASE MOTOR

Clarence B. Hathaway and Richard F. Woll, Pittsburgh, Pa., assignors to Westinghouse Electric Corporation, East Pittsburgh, Pa., a corporation of Pennsylvania Application October 12, 1944, Serial No. 558,312

19 Claims. (Cl. 318—225)

Our invention relates to method and means for so compensating a self-starting single-phase induction motor as to practically eliminate the intermittent or slip-frequency or beat-frequency magnetic noise during running conditions, when the starting winding is disconnected from the source of energy. This noise is due to the inevitable irregularities of the magnetic flux in the air gap, which are due either to eccentricity of the rotor or to a point or points of low magnetic reluctance at one or more points around the rotor, or both. The noise occurs as a pulsating grinding noise, which occurs at a beat-frequency which is proportional to the difference between the motor-speed and the synchronous speed.

Heretofore, the problem of such intermittent magnetically caused noise has not been at all urgent, because, for many years, it was the practice to utilize either ball-bearings or a heavy type of journal bearing, both of which bearings had sufficient damping-effect to restrict the radial displacements of the rotor to such a small value that the trouble was not experienced to any material extent. In recent years, however, a very much cheaper type of bearing has been developed, which makes possible a saving of some twenty or thirty cents in the cost of manufacturing each motor, and is otherwise desirable, but this new bearing has had an insufficient amount of damping-effect with respect to slight radial rotor-displacements, and hence the noise-trouble has become more pronounced.

It is an important object of our invention, therefore, to couple, with this use of the new type of journal bearings, a practical type of compensating means for preventing the field-strength or flux from pulsating, or becoming stronger in one part of the circumference than another, during the rotation of the rotor-member.

With the foregoing and other objects in view, our invention consists in the systems, methods, apparatus, combinations and parts hereinafter described and claimed, and illustrated in the accompanying drawing, wherein:

Figure 1:
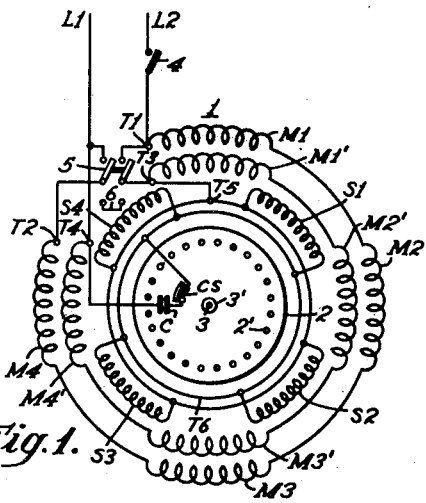
Figure 1 is a diagrammatic view of circuits and apparatus, showing our invention in a preferred form of embodiment, with the various field-coils disposed about the circumference of the stator member, to illustrate the relative physical positions of the coils.
Figure 2:
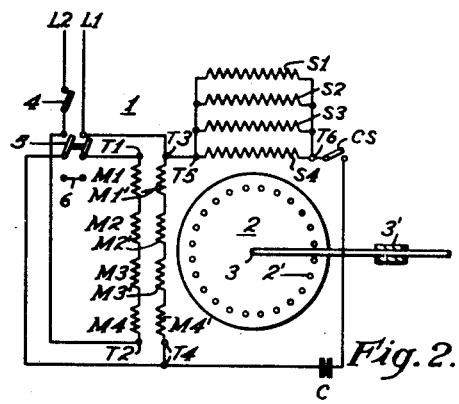
Fig. 2 is a similar view of the same motor, with the coils arranged to more readily illustrate the electrical connections.

In Figures 1 and 2, we have shown a preferred form of embodiment of our invention, in which the starting winding is utilized as a compensating winding, in the sense of equalizing the field-pole strength at four points around the motor, in a high-starting-torque dual-voltage single-phase motor of the capacitor-start induction-run type. The motor is provided with a stationary primary member 1, and a rotatable secondary member 2, the latter being mounted on a shaft 3 which is journalled on bearings 3' of the new type of inexpensive bearing which has only a small amount of damping-effect with respect to slight radial rotor-displacements. The rotor member also controls the actuation of a centrifugal switch CS.

Because the motor shown in Figs. 1 and 2 is a dual-voltage motor, such as a 115–230 volt 60-cycle motor, it is provided with two main windings M1—M2—M3—M4 and M1'—M2'—M3'—M4', which are closely coupled together by being wound in the same slots in a known manner. The motor illustrated is a four-pole motor, which is by long odds the most popular pole-number. We have distinguished the several pole-windings by showing them separately, and numbering them consecutively around the circumference of the stator-member 1, as indicated at M1, M2, etc. The pole-windings M1, M1', M3 and M3' are wound in one direction, so as to form north poles for a given direction of current-flow, while the pole-windings M2, M2', M4, and M4' are wound in the opposite direction, so as to form south poles for the same direction of current-flow.

Since these self-starting single-phase motors are made in large quantities, under sharply competitive conditions, it is economically necessary that they be made as inexpensively as possible, with the best possible utilization of the slot-space or winding-space available in the motor, and to this end it is practically necessary for the four pole-windings of each of the main-winding circuits to be connected together in series, because if they were connected in parallel, it would be necessary to utilize four times as many turns for each of the individual pole-windings, which would involve a smaller space-factor and a less rugged design, with smaller insulated wire for the main windings.

For high-voltage, or 230-volt, operation, the two main windings M1—M2—M3—M4 and M1'—M2'—M3'—M4' are connected in series, as shown by the lower position of an external terminal-connection-changer, which is indicated symbolically by means of a double-throw, two-pole switch 5. The first main winding M1—M2—M3—M4 has the two terminals T1 and T2, while the second main winding M1'—M2'—M3'—M4' has the two terminals T3 and T4. The terminal T4 is shown as being permanently connected to the supply-line L1, while the terminal T1 is connected to a second supply-line L2 through a control-switch or starting-switch 4.

The terminals T2 and T3 are connected to the central poles of the double-throw switch 5. The lower poles of the switch 5 are connected together by a series winding-connection 6, which connects the two main windings in series with each other, so as to adapt the motor to be properly energized when 230-volt single-phase power is applied to the lines L1 and L2. The upper poles of the double-throw switch 5 are connected to the motor-terminals T4 and T1, which are respectively connected to the lines L1 and L2, so that, in the upper position of the switch 5, the two main windings of the motor are connected in parallel with each other, across the lines L1—L2, thus properly energizing the motor when 115-volt single-phase energy is applied to the lines L1—L2. Thus, 115 volts are applied to each one of the main windings T1—T2 and T3—T4, for both 115-volt line-energization and 230-volt line-energization. This arrangement of the main windings is a common practice in the art.

In order for a single-phase induction motor to be self-starting, it is generally necessary to provide it with a starting winding, which we have shown as a dephased winding S1, S2, S3, S4 on the stator-member of the motor. While there are several known types of starting windings, we have chosen to illustrate a starting winding of a type which is adapted to be connected in series with a capacitor C, in order to give it the proper time-phase relationship with respect to the currents in the main windings. The starting winding is designed for only intermittent duty, being energized from the supply-line only during the few seconds required for starting, each time the motor is started. When the motor attains a certain fraction of its running-speed, the centrifugal switch CS, or any other equivalent switching-means, automatically opens, and disconnects the starting winding from its energizing circuit. Because of its intermittent duty, the starting winding is commonly wound with much smaller wire than the main winding. In accordance with a common practice, the starting winding is connected, through its centrifugal switch CS and its capacitor C, across the terminals T3—T4 of one of the main windings M1'—M2'—M3'—M4', so that the starting-winding circuit is always impressed with 115 volts, whether the line-voltage is 115 or 230 volts.

Heretofore, it has been customary to connect the four starting-winding pole-windings S1, S2, S3 and S4 in series, the same as the main-winding pole-windings, and for the same reason. However, in accordance with our present invention, we preferably connect these starting-winding pole-windings all in parallel, although it may be feasible, in some rare instances, to connect the starting-winding pole-windings in a series-parallel relation, similar to the subsequently described primary-winding connection of Fig. 3, so that they are paralleled only in pairs, rather than having all of the starting-winding pole-windings connected in a single parallel circuit. This parallel-connection of the starting-winding pole-windings, in our preferred construction as illustrated, means that four times the number of turns has to be put in each one of the starting-winding pole-windings S1, S2, S3 and S4, as compared to the usual practice, in which the four pole-windings were connected in series. This adds somewhat to the cost of the winding, but it makes possible the use of a still greater saving in the cost of the bearing 3', as will subsequently be explained in greater detail.

As shown in Figs. 1 and 2, therefore, the starting winding S1, S2, S3, S4 is provided with the terminals T5 and T6, and all four of the starting-winding pole windings S1, S2, S3 and S4 are connected in parallel, across these two starting-winding terminals T5 and T6. The starting-winding terminal T5 is permanently connected to the main-winding terminal T3. The starting-winding terminal T6 is connected to the main-winding terminal T4 through the centrifugal switch or other starting switch CS and the capacitor C.

The rotor-member 2 of our motor is provided with a secondary winding which is adapted to carry only induced currents. Preferably, as shown, this secondary winding is in the form of a squirrel-cage winding 2'. Since the motor is to have a reasonably good starting-torque, the squirrel-cage secondary winding 2' has to have a fairly high resistance, and this is the customary design for motors of this type.

Because the squirrel-cage winding 2' is of a fairly high resistance, it does not operate very perfectly to smooth out all flux-variations in the motor, and hence it does not suffice to adequately counteract the tendency of the motor-flux, under one of the four main poles, to become abnormally large, at a beat-frequency, at certain moments when it happens that the primary current in the main winding for that pole is a maximum at the same moment when a spot of maximum permeability, on the rotor-member 2, comes under that particular main-winding pole.

As previously explained, there is always a certain portion (or portions) of the periphery of the rotor-member, where the magnetic reluctance of the main flux-path is a minimum, which is to say that the magnetic flux will be a maximum, for a given number of ampere-turns of magnetizing force. This low-reluctance spot may be the result of the manner in which the iron crystals of the rotor-core happen to be aligned, or the result of inevitable differences in the treatment-history of the laminations making up the rotor-core, or it may be the result of certain unavoidable eccentricities of the stator or the rotor under competitively practicable quantity-production manufacturing-procedure, or it may result from a combination of these or other causes. Heretofore, bearings have been utilized which happened to have a small, but adequate, amount of damping-effect with respect to slight radial rotor-displacements, and the intermittent, or beat-frequency, growling noise, from this cause, has not been objectionable.

However, when a manufacturer takes advantage of the cost-savings which are made possible by new types of journal bearings, having an inadequate amount of damping-effect with respect to slight rotor-displacements in a radial direction, the rotor-member has been lifted, or drawn toward the stator-member, at that one spot where the stator ampere-turns, at the peak of a half-cycle of primary current, coincided with the low-reluctance spot of the rotor-member, thus causing the rotor-member to rise, in its bearing, taking up the loose play which must inevitably be left in the bearing, and causing the objectionable intermittent growling noise which has been mentioned.

The principal object of our invention is to provide electrical means for making it impossible, or less possible, for the magnetic flux to grow more rapidly, in one portion of the circumference of the stator-member than in another corresponding portion where the flux magnitude should be instantaneously equal, in either a north or a south polarity, at any given moment.

Theoretically, the flux in a main-winding pole at one spot, as at the top of the machine, should be balanced against the flux at a diametrically opposite spot, as at the bottom of the machine, so that the rotor-member will not be lifted off of its bearing-seat, but practically, it may suffice to balance one main-winding north-pole against the next adjacent main-winding south-pole, or better yet, all of the main-winding poles should be connected in parallel with each other. This is usually more expensive than connecting the starting-winding pole-windings in parallel with each other, because of the smaller size of the starting-winding conductor as the result of its intermittent duty. Experiment has shown that, notwithstanding the fact that the starting-winding pole-windings are dephased in quadrature phase-relation with respect to the main-winding pole-windings, sufficient main-winding flux equalization is obtained by paralleling all of the starting-winding pole-windings S1, S2, S3 and S4, as shown in Fig. 1.

If the flux in one of the starting-winding pole-windings begins to increase to greater values than the instantaneous flux-strength of the average of the other three, circulating current will be induced through the parallel winding-connections opposing this abnormal flux-increase in the one pole.

In Figs. 1 and 2, this compensation is accomplished, therefore, by the parallel connection of all four of the starting-winding pole-windings S1, S2, S3 and S4 (in a four-pole motor) in parallel-circuit relation to each other, across the starting-winding terminals T5 and T6. This is a permanent parallel connection, which holds true regardless of whether the centrifugal starting-switch CS is closed or open, so that this flux-equalizing effect is available during the running conditions, when it is necessary to avoid the noise, notwithstanding the fact that the starting winding is not energized under these conditions. During the brief moment of starting, all motors are a little bit noisy, anyway, and we are not particularly concerned with the noise under the starting conditions, although sensitive noise measurement might show that our motor is slightly less noisy, under starting conditions, than without the parallel-winding equalizer-connections.

As has been intimated, the broad spirit of our invention relates to any winding-means or connection means for providing parallel-connected coils on the stator-member, for equalizing the field-strength of one portion of the circumference with respect to the field-strength of another portion which would have an equal field-strength if the rotor-reluctance were completely symmetrical at all points around the circumference, under all running-conditions of the motor. For this purpose, it is necessary to utilize a rather considerable number of turns: just a small number of turns, in one place, paralleled with an equally small number of turns in another place, symmetrically positioned with respect to another pole of the motor, would not be enough: the number of turns of the parallel-connected coils or winding-portions has to be considerable. For the reasons which have already been explained, we prefer to provide these equalizing connections by a special parallel-winding connection of the starting-winding pole-portions.

Figure 3:
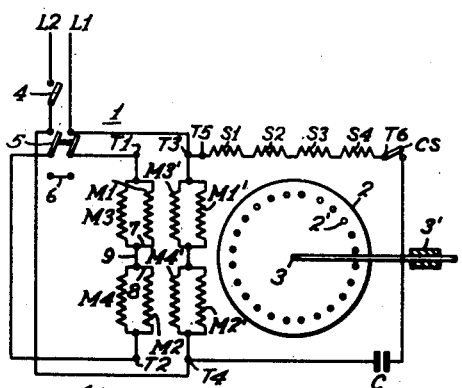
Fig. 3 is a view similar to Fig. 2, showing a second form of embodiment of our invention.

However, as shown in Fig. 3, this may be done by a special design and connection of the main windings M1—M2—M3—M4 or, in a dual-voltage motor, by a special design and connection of both sets of main-windings M1—M2—M3—M4 and M1'—M2'—M3'—M4'. In this case, it is usually sufficient to parallel the main-winding pole-windings in pairs only, as distinguished from paralleling all four of them, in a four-pole motor, and preferably these pairs are diametrically opposite pairs on opposite sides of the motor-circumference, although adequate compensation may be obtained by paralleling any pairs of main-winding pole-windings, not necessarily diametrically opposite from each other.

In Fig. 3, the main-winding pole-windings M1 and M3 are permanently parallel-connected together at 7, while the main-winding pole-windings M2 and M4 are permanently connected together in parallel at 8, and the two parallel-connected pairs are serially connected at 9, and similar connections are provided for the other main winding-circuits M1'—M3' and M2'—M4'. This form of connection is applicable to any single-phase motor having more than two poles. The starting-winding pole-windings S1, S2, S3 and S4, in this case, may be connected together in series-circuit relation, as shown in Fig. 3, or in any other conventional relationship. The effect of the parallel-pole main-winding connections in Fig. 3, is to damp out flux-pulsations, as previously explained, and it thus constitutes an alternative arrangement which may be utilized, rather than the particular preferred arrangement which is shown in Figs. 1 and 2.

Figure 4:
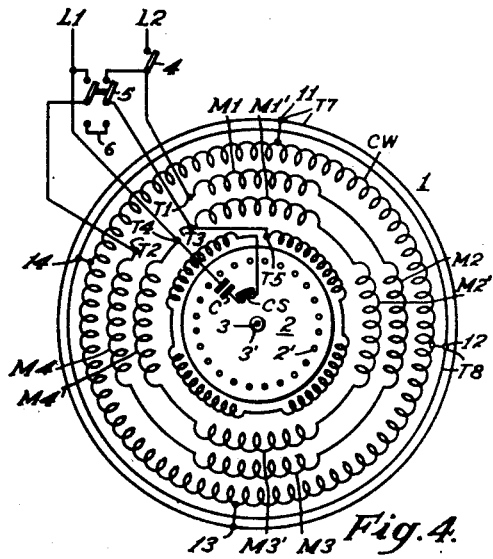
Fig. 4 is a view similar to Fig. 1, showing a third form of embodiment of our invention.

In Fig. 4, we have shown another possible form of embodiment of our invention, in which a separate compensating winding CW is wound on the stator-member 1 of the motor. This separate winding CW may consist only of a certain number of pole-winding turns for each pole of the motor, or it may be a continuous winding, as shown in Fig. 4, running continuously all the way around the stator-member 1. Corresponding portions of the compensating winding CW, which are symmetrically related with respect to the several main-winding poles, are permanently connected together in parallel, as by cross-connections 11, 12, 13 and 14, to two compensating-winding terminals or paralleling points T7 and T8. As shown, the diametrically opposite cross-connections 11 and 13 are made to the terminals T7, while the quadrature-related cross-connections 12 and 14 (in a four-pole motor) are made to the other terminal T8, so that the portion of the compensating winding CW, between any two of the cross-connections, as 11 and 12, will correspond to the complete circumference, divided by the number of poles.

Of the three possible methods of compensating, by either the starting windings, or the main windings, or the separate compensating windings, the separate compensating-winding arrangement of Fig. 4 is the most costly, in requiring not only the cost of the separate winding CW, but also the cost, in the form of a larger stator-member having deeper slots, or more of them, in order to provide room for accommodating the extra windings. It has the advantage, however, of having the main windings and the starting windings both connected in series-circuit relation, as shown.

Figure 5:
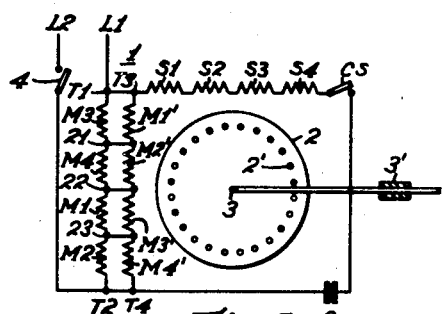
Fig. 5 is a view similar to Fig. 2, showing a fourth form of embodiment of our invention.

In Fig. 5, a variation in the equalizer-connections of Fig. 3 is shown, in a single-voltage form of embodiment. In Fig. 3, the characteristic feature was that the main-winding pole-windings were connected together, at least in parallel-connected pairs, or even all of the pole-windings were connected together in one parallel circuit.

In Fig. 5, however, the main winding may be wound with parallel winding-strands, in the manner which is customary for dual-voltage motors, producing the two main winding circuits M1—M2—M3—M4 and M1'—M2'—M3'—M4' running all the way around the stator-member, with winding-portions for each of the four poles. However, instead of paralleling these two main-circuit windings at their starting and ending points, respectively, we have opened up one of the main-winding circuits in its middle, and closed its ends together, so that the first main-winding circuit extends from the terminal T1, through the pole-windings M3, M4, M1 and M2, to the other terminal T2, while the other main-winding circuit extends from the terminal T3, through the pole-windings M1', M2', M3' and M4', to the other terminal T4. The terminals T1 and T3 are permanently connected together, and to the line L1, while the terminals T2 and T4 are permanently connected together and to a control-switch 4 to the other line L2.

Intermediate cross-connections are then provided, at 21, 22 and 23, as shown in Fig. 5, between the successive junctions between the successive pole-windings of the two main-winding circuits, so that the pole-winding M3 of one circuit is permanently parallel-connected to the (preferably diametrically opposite) pole-winding M1', of another pole of the other main-winding circuit, so that the field-strengths of these parallel-connected poles are equalized. The starting-winding connections in Fig. 5 may be the same as in Fig. 3.

While we have shown our invention in several preferred forms of embodiment, we wish it to be understood that we are not limited to these precise forms which are intended only for illustrative purposes. We desire, therefore, that the appended claims shall be accorded the broadest construction consistent with their language.

We claim as our invention:

1. A self-starting single-phase capacitor-start induction motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, a rotor-journalling bearing having only a small amount of damping-effect, inadequate to damp out slight but audible radial rotor-displacements, and means for providing parallel-connected coils on the stator-member for equalizing the field-strength of one portion of the circumference with respect to the field-strength of another portion which would have an equal field-strength if the rotor-reluctance were completely symmetrical at all points around the circumference under all running-conditions of the motor 2. A self-starting single-phase capacitor-start induction motor having more than two poles, said motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, a rotor-journalling bearing having only a small amount of damping-effect, inadequate to damp out slight but audible radial rotor-displacements, and means for providing as many parallel-connected stator-member coils as there are poles, said parallel-connected coils being connected all in parallel with each other and being equally spaced circumferentially for equalizing the field-strength of one portion of the circumference with respect to the field-strength of another portion which would have an equal field-strength if the rotor-reluctance were completely symmetrical at all points around the circumference under all running-conditions of the motor.

3. A self-starting single-phase capacitor-start induction motor having more than two poles, said motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, a rotor-journalling bearing having only a small amount of damping-effect, inadequate to damp out slight but audible radial rotor-displacements, and means for providing at least as many parallel-connected stator-member coils as there are poles, said parallel-connected coils being connected in a plurality of parallel-connected pairs, the coils of each pair being equally spaced circumferentially for equalizing the field-strength of one portion of the circumference with respect to the field-strength of another portion which would have an equal field-strength if the rotor-reluctance were completely symmetrical at all points around the circumference under all running-conditions of the motor.

4. A self-starting single-phase capacitor-start induction motor having more than two poles, said motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, a rotor-journalling bearing having only a small amount of damping-effect, inadequate to damp out slight but audible radial rotor-displacements, and means for providing at least as many parallel-connected stator member coils as there are poles, said parallel-connected coils being connected in a plurality of parallel-connected pairs, the coils of each pair being diametrically opposite to each other, on opposite sides of the circumference.

5. A self-starting single-phase capacitor-start induction motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by one of said stator-member windings being composed of matched pole-coils having permanent cross-connections for equalizing the field-strength of one portion of the circumference with respect to the field-strength of another portion which would have an equal field-strength if the rotor-reluctance were completely symmetrical at all points around the circumference under all running-conditions of the motor.

6. A self-starting single-phase capacitor-start induction motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by one of said stator-member windings being composed of a plurality of separate windings for different poles, and cross-connections whereby at least two of said separate pole-windings are permanently connected in parallel-circuit relation for equalizing the field-strength of one portion of the circumference with respect to the field-strength of another portion which would have an equal field-strength if the rotor-reluctance were completely symmetrical at all points around the circumference under all running-conditions of the motor.

7. A self-starting single-phase capacitor-start induction motor having more than two poles, said motor having a stator-member having a main winding, a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by one of said stator-member windings being composed of as many parallel-connected stator-member coils as there are poles, said parallel-connected coils being connected all in parallel with each other and being equally spaced circumferentially for equalizing the field-strength of one portion of the circumference with respect to the field-strength of another portion which would have an equal field-strength if the rotor-reluctance were completely symmetrical at all points around the circumference under all running-conditions of the motor.

8. A self-starting single-phase capacitor-start induction motor having more than two poles, said motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by one of said stator-member windings being composed of at least as many parallel-connected stator-member coils as there are poles, said parallel-connected coils being connected in a plurality of parallel-connected pairs, the coils of each pair being equally spaced circumferentially for equalizing the field-strength of one portion of the circumference with respect to the field-strength of another portion which would have an equal field-strength if the rotor-reluctance were completely symmetrical at all points around the circumference under all running-conditions of the motor.

9. A self-starting single-phase capacitor-start induction motor having more than two poles, said motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by one of said stator-member windings being composed of at least as many parallel-connected stator-member coils as there are poles, said parallel-connected coils being connected in a plurality of parallel-connected pairs, the coils of each pair being diametrically opposite to each other, on opposite sides of the circumference.

10. A self-starting single-phase capacitor-start induction motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by said starting winding being composed of a separate winding for each pole of the motor, and electrical connections for permanently connecting all of said separate pole-windings together in parallel-circuit relation.

11. A self-starting single-phase capacitor-start induction motor having a stator-member having a main winding and a starting winding, a rotor-member having an induction-motor secondary winding, and switching-means for disconnecting the starting winding from its energizing source during running conditions, characterized by said starting winding being composed of a plurality of separate windings for different poles, and cross-connections whereby at least two of said separate pole-windings are permanently connected to each other in parallel-circuit relation.

12. A self-starting single-phase capacitor-start induction motor having a stator-member having a main winding and a starting winding, a rotor-member having an induction-motor secondary winding, and switching-means for disconnecting the starting winding from its energizing source during running conditions, characterized by said starting winding being composed of a separate winding for each pole of the motor, and electrical connections for permanently connecting all of said separate pole-windings together in parallel-circuit relation.

13. A dual-voltage self-starting single-phase capacitor-start induction motor having a stator-member having a double-circuit main winding and a starting winding, a rotor member having an induction-motor secondary-winding, changeable primary-winding energizing-connections whereby the two main-winding circuits may be connected either in series, for high-voltage operation, or in parallel, for operation at one-half of the high-voltage rating, starting-winding energizing-connections for energizing the starting-winding in parallel across one of said main-winding circuits regardless of whether the series or parallel primary-winding energizing-connections are used for the two main-winding circuits, and switching-means for disconnecting the starting winding from its energizing source during running conditions, characterized by said starting winding being composed of a plurality of separate windings for different poles, and cross-connections whereby at least two of said separate pole-windings are permanently connected to each other in parallel-circuit relation.

14. A dual-voltage self-starting single-phase capacitor-start induction motor having a stator-member having a double-circuit main winding and a starting winding, a rotor-member having an induction-motor secondary-winding, changeable primary-winding energizing-connections whereby the two main-winding circuits may be connected either in series, for high-voltage operation, or in parallel, for operation at one-half of the high-voltage rating, starting-winding energizing-connections for energizing the starting-winding in parallel across one of said main-winding circuits regardless of whether the series or parallel primary-winding energizing-connections are used for the two main-winding circuits, and switching-means for disconnecting the starting winding from its energizing source during running conditions, characterized by said starting winding being composed of a separate winding for each pole of the motor, and electrical connections for permanently connecting all of said separate pole-windings together in parallel-circuit relation.

15. A self-starting single-phase capacitor-start induction motor having more than two poles, said motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by said starting winding being composed of as many parallel-connected pole-windings as there are poles, all permanently connected together in parallel-circuit relation to each other.

16. A self-starting single-phase capacitor-start induction motor having a stator-member having a main winding and a starting winding, a rotor-member having a squirrel-cage winding of sufficiently high resistance to produce a reasonably good starting-torque and to cause the squirrel-cage winding to inadequately counteract the tendency of the motor-flux under one of the poles to become abnormally large, at a beat-frequency, at certain moments when it happens that the primary current in the main winding for that pole is a maximum at the same moment when a spot of maximum permeability, on the rotor-member, comes under that pole, switching-means for disconnecting the starting winding from its energizing source during running conditions, and a rotor-journalling bearing having only a small amount of damping-effect, inadequate to damp out slight but audible radial rotor-displacements, characterized by said main winding being composed of at least one separate winding for each pole of the motor, and cross-connections whereby at least two of said separate pole-windings are permanently connected in parallel-circuit relation for equalizing the field-strength of one portion of the circumference with respect to the field-strength of another portion which would have an equal field-strength if the rotor-reluctance were completely symmetrical at all points around the circumference under all running-conditions of the motor.

17. A single-phase running induction motor having more than two poles, said motor having a single-phase main primary winding and having a secondary winding adapted to carry only induced currents, characterized by said main winding being disposed in at least two parallel-connected main-winding circuits, each of said main-winding circuits comprising a plurality of serially connected pole-windings on a plurality of poles, the first pole-winding of one main-winding circuit being for a different pole than the first pole-winding of the other main-winding circuit, the second pole-windings, and any other corresponding pole-windings, of the two main-winding circuits being also for different poles, in each case, and cross-connections for permanently paralleling the corresponding pole-windings of the two parallel-connected main-winding circuits.

18. A single-phase running induction motor having more than two poles, said motor having a single-phase main primary winding and having a secondary winding adapted to carry only induced currents, characterized by said main winding being composed of at least one separate winding for each pole of the motor, cross-connections for permanently connecting the separate pole-windings together in pairs, and series-circuit connections for permanently connecting the pairs in series.

19. A dual-voltage self-starting single-phase induction motor having a stator-member having a double circuit main winding and a starting winding, a rotor-member having an induction-motor secondary-winding, changeable primary-winding energizing connections whereby the two main-winding circuits may be connected either in series, for high-voltage operation, or in parallel, for operation at one-half of the high-voltage rating, starting-winding energizing-connections for energizing the starting-winding in parallel across one of said main-winding circuits regardless of whether the series or parallel primary-winding energizing-connections are used for the two main-winding circuits, and switching-means for disconnecting the starting winding from its energizing source during running conditions, characterized by said stator member also having a plurality of equalizer-coils, separate from both the main winding and the starting winding, said equalizer-coils being disposed in corresponding phase-positions with respect to a plurality of poles of the motor, respectively, and cross-connections whereby at least two of said equalizer-coils are permanently connected to each other in parallel-circuit relation.

CLARENCE B. HATHAWAY.
RICHARD F. WOLL.

REFERENCES CITED

The following references are of record in the file of this patent:

UNITED STATES PATENTS

| Number | Name | Date |
|---|---|---|
| 1,859,369 | Kennedy | May 24, 1932 |
| 1,886,895 | Meyers | Nov. 8, 1932 |
| 1,983,741 | Dederick | Dec. 11, 1934 |